United States Patent
Brown et al.

(10) Patent No.: US 7,509,120 B2
(45) Date of Patent: Mar. 24, 2009

(54) SYSTEM AND METHOD FOR UPDATING MESSAGE TRUST STATUS

(75) Inventors: Michael K. Brown, Ontario (CA);
Michael S. Brown, Ontario (CA);
Herbert A. Little, Ontario (CA)

(73) Assignee: Research In Motion Limited, Waterloo, Ontario (CA)

( * ) Notice: Subject to any disclaimer, the term of this patent is extended or adjusted under 35 U.S.C. 154(b) by 86 days.

(21) Appl. No.: 10/934,765

(22) Filed: Sep. 7, 2004

(65) Prior Publication Data

US 2006/0053291 A1    Mar. 9, 2006

(51) Int. Cl.
*H04M 1/66* (2006.01)
(52) U.S. Cl. ............... 455/411; 379/161; 379/184
(58) Field of Classification Search ........... 455/411; 379/161, 184, 168; 380/247–250
See application file for complete search history.

(56) References Cited

U.S. PATENT DOCUMENTS

| 5,299,263 | A  | * | 3/1994 | Beller et al. ............. 380/30 |
| 6,233,577 | B1 | * | 5/2001 | Ramasubramani et al. .... 707/9 |
| 6,327,656 | B2 | * | 12/2001 | Zabetian ................. 713/176 |
| 6,421,781 | B1 | * | 7/2002 | Fox et al. ................. 726/4 |
| 6,714,778 | B2 | * | 3/2004 | Nykanen et al. ......... 455/414.1 |
| 6,889,212 | B1 | * | 5/2005 | Wang et al. ............... 705/59 |
| 6,990,581 | B1 | * | 1/2006 | Rubin .................... 713/170 |
| 7,016,666 | B2 | * | 3/2006 | Lauper et al. ........... 455/411 |
| 2002/0046353 | A1 | * | 4/2002 | Kishimoto ............... 713/202 |
| 2002/0173295 | A1 | * | 11/2002 | Nykanen et al. ........ 455/414 |
| 2005/0037736 | A1 | * | 2/2005 | Jung .................... 455/411 |

FOREIGN PATENT DOCUMENTS

WO    02/102009 A2    12/2002
WO    03/075530 A1    9/2003

* cited by examiner

*Primary Examiner*—Lester Kincaid
*Assistant Examiner*—Sayed T Zewari
(74) *Attorney, Agent, or Firm*—Dimock Stratton LLP; Etienne de Villiers

(57) ABSTRACT

Systems and methods for processing encoded messages within a wireless communications system are disclosed. A server within the wireless communications system performs signature verification of an encoded message and provides, together with the message, an indication to the mobile device that the message has been verified. In addition, the server provides supplemental information, such as, for example, a hash of the certificate or certificate chain used to verify the message, to the device, to enable the device to perform additional checks on the certificate, such as, for example, validity checks, trust checks, strength checks, or the like.

15 Claims, 5 Drawing Sheets

SYSTEM AND METHOD FOR UPDATING MESSAGE TRUST STATUS

BACKGROUND OF THE INVENTION

1. Field of the Invention

The present invention relates generally to an electronic messaging system that is capable of processing encoded messages and information. In particular, the disclosure is directed to a system in which an electronic message server performs at least a portion of the verification functions typically performed by a mobile wireless communications device having secure electronic messaging capability, wherein the electronic message server, in addition to providing an indication of whether a message has been verified by the server, provides information to the mobile wireless communications device so that the device can perform additional trust, validity and strength checks, or the like.

2. Related Art

Exchanging cryptographically encoded secure electronic messages and data, such as, for example, e-mail messages, is well known. In many known electronic message exchange schemes, signatures, encryption or both are commonly used to ensure the integrity and confidentiality of information being exchanged between a sender and a recipient of the electronic messages. In an e-mail system, for example, the sender of an e-mail message may either sign the message, encrypt the message or both sign and encrypt the message. These actions may be performed using well-known standards, such as, for example, Secure Multipurpose Internet Mail Extensions (S/MIME), Pretty Good Privacy™ (PGP™), OpenPGP, and numerous other secure e-mail standards.

In general, secure e-mail messages are relatively large. For example, S/MIME can increase the size of an e-mail message by a factor of ten or more in some situations. This size augmentation presents difficulties, especially in devices that have a limit on the size of a message that can be processed, such as, for example, a mobile wireless communications device. Such a device may also experience difficulty handling a message wherein only a portion of the message has been transferred to the device because of the above-mentioned size limitations.

For example, if a message is larger than the size limit of the device, then the entire message will never reach the device. If this large message is a signed or encoded message, then all the data required to verify the signature may not be sent to the device, and thus, the device may not be able to verify the signature.

Exemplary solutions wherein an electronic message server performs some or all of the verification functions typically performed by the device are described in co-pending, commonly assigned U.S. patent application Ser. No. 10/914,634 entitled "Server Verification of Secure Electronic Messages" and U.S. patent application Ser. No. 10/916,098, entitled "System and Method for Processing Encoded Messages," the disclosures of which are incorporated by reference herein in their entirety. In these applications, various systems and methods for providing server-based verification of electronic messages are described. Typically, these solutions provide an indication to a device that a message or digital signature appended to the message has been verified by the server. Additionally, these solutions may provide partial processing of a large electronic message to assist the device in completing its own verification process. As a further enhancement to these solutions, it is envisioned that additional information may be provided to the device so that the device can perform additional trust, validity and strength checks, or the like, on the message, if the user desires.

BRIEF SUMMARY OF THE INVENTION

In view of the foregoing, we have now identified an efficient and easy to implement system and method for verifying secure electronic messages, wherein the processing overhead associated with decoding and/or verifying secure messages is distributed (either fully or partially) from a device having a size limit, such as, for example, a mobile wireless communications device, to a device having the ability to process much larger size messages, such as, for example, a server within the wireless communications system.

According to an exemplary embodiment of the present disclosure, a server within the wireless communications system has the ability to verify a signature appended to a secure electronic message. The server may perform this check automatically for every secure message, or may do so optionally, such as, for example, in cases where the size of the message is too large to be verified on a size-limited device, such as, for example, a mobile wireless communications device. After verifying the signature, the server will send an indication to the device that the signature has been verified. In addition, the server may send supplemental information, such as, for example, a hash of the certificate used to verify the signature, to the device, so that the device may optionally perform further validity, trust and strength checks, or the like. Providing this supplemental security information to the device provides the user with a robust verification solution.

The foregoing exemplary embodiments provide a solution to the problem of verifying secured electronic messages by a size-limited device by distributing the processing overhead to a server of the electronic messaging system, thereby enabling the sharing of system resources to assist the size-limited device in verifying secure electronic messages. In addition, the exemplary embodiments described herein enable the device to perform additional checks of the signature information to provide a stronger indication of validity of the signature.

The advantages attendant with the various embodiments of the invention described above are provided by the method and system of updating trust messages on the device disclosed and described herein with reference to the drawings.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which.

DETAILED DESCRIPTION OF EXEMPLARY EMBODIMENTS

Figure 1:
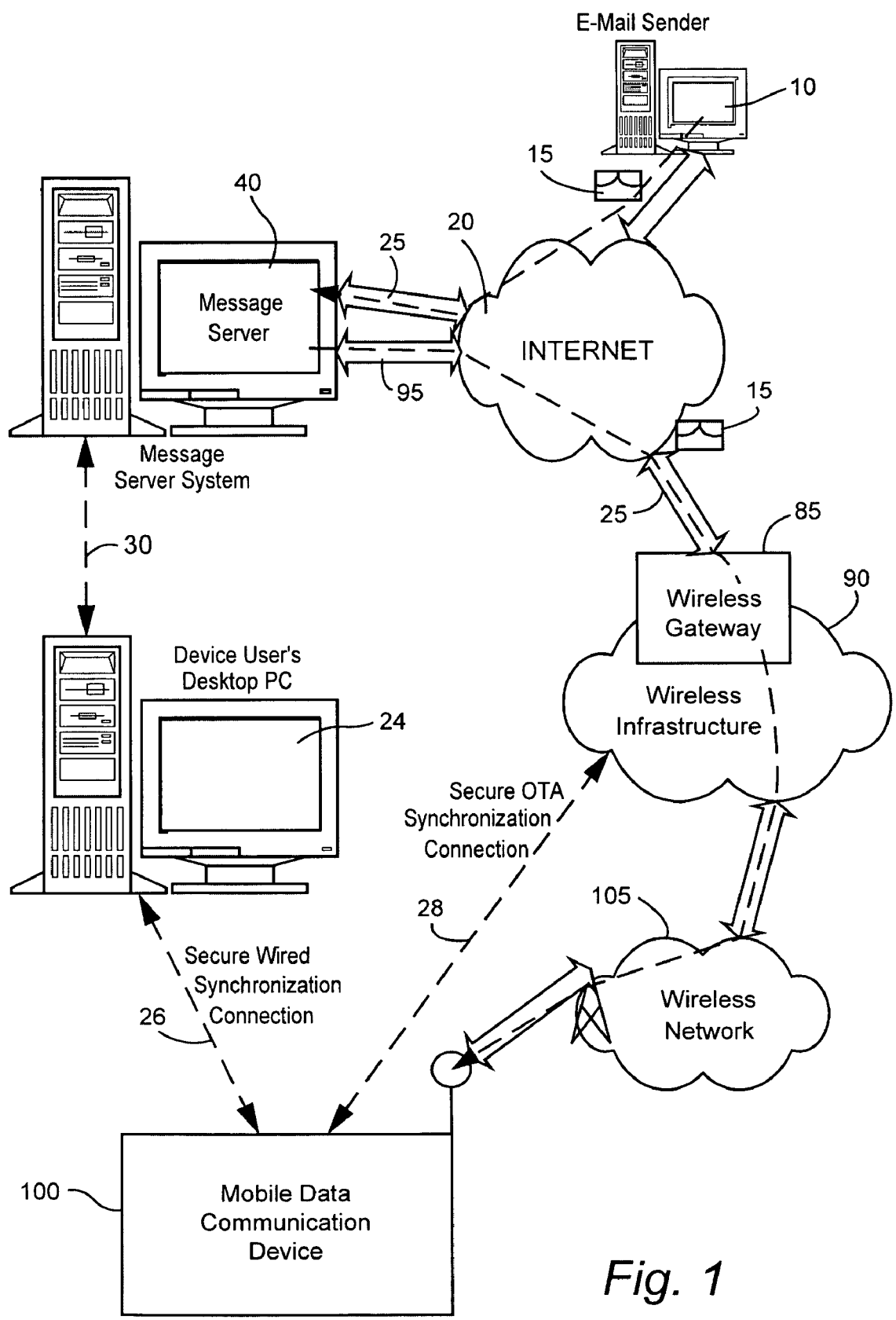
FIG. 1 is an overall system wide schematic view of an exemplary wireless e-mail communication system incorporating a mobile wireless communications device with the descriptive error messaging in accordance with an exemplary embodiment of the present invention.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have pre-defined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
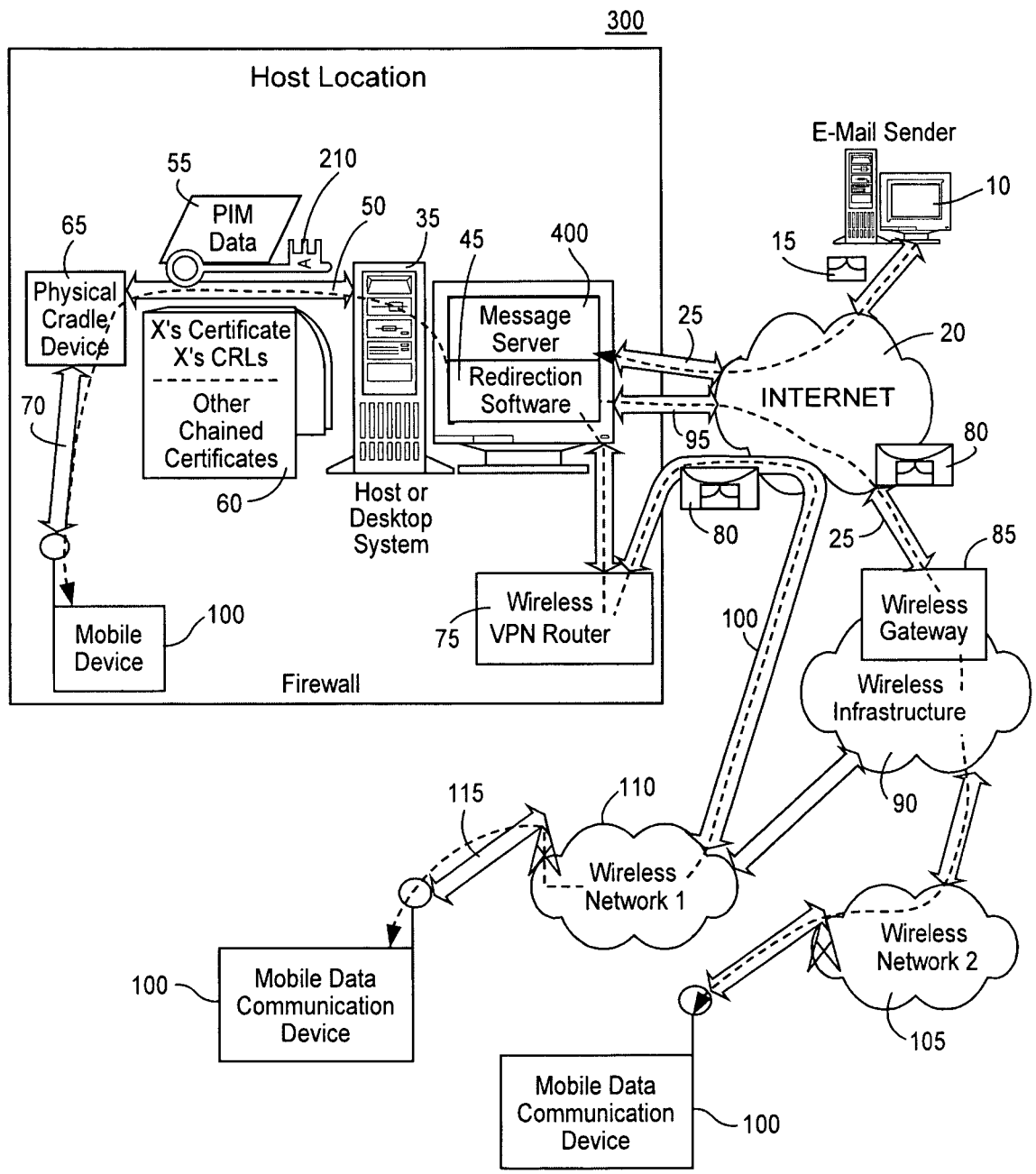
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
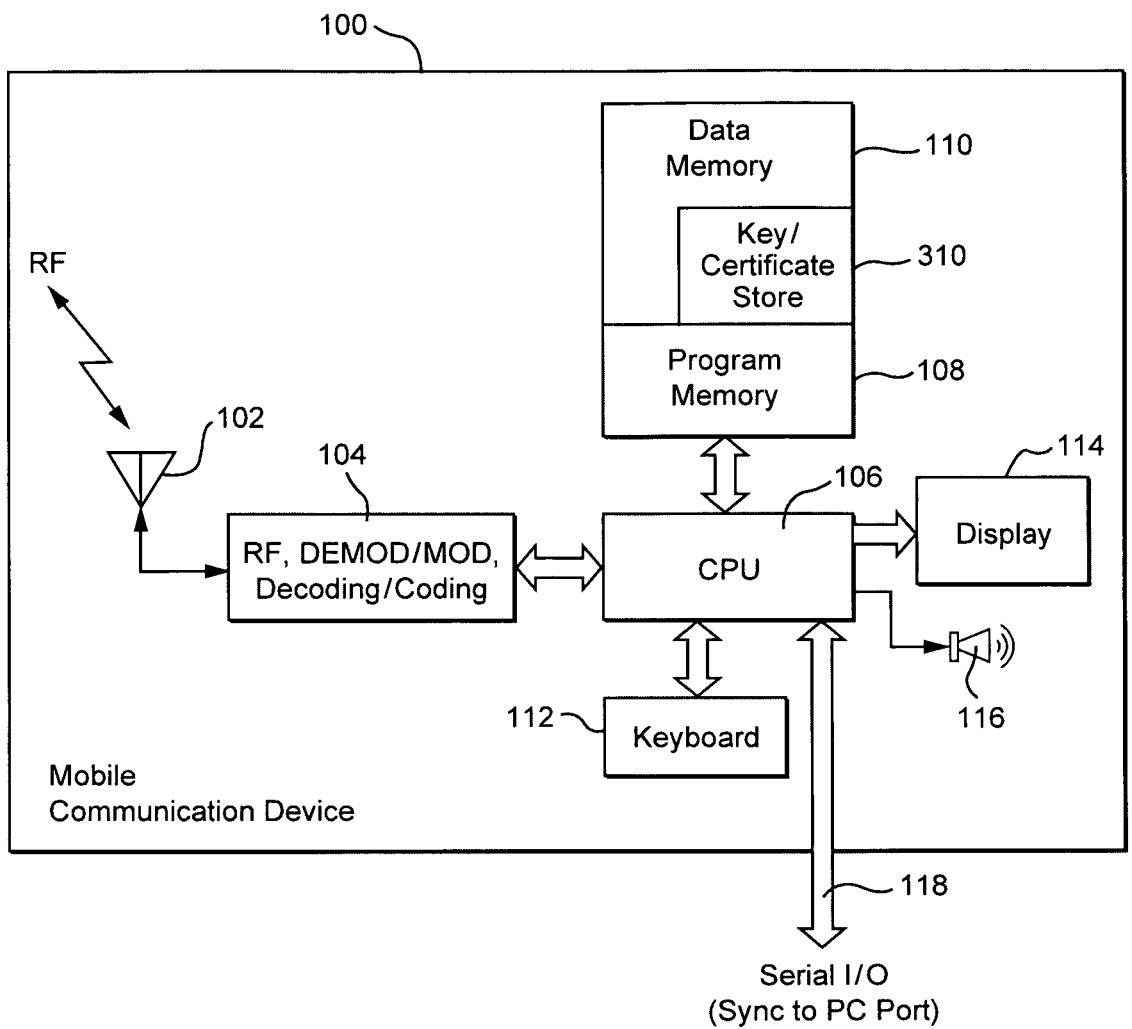
FIG. 3 is an illustrative schematic block diagram of an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 30 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

E-mail messages generated using the S/MIME and PGP techniques may include encrypted information, a digital signature on the message contents, or both. In signed S/MIME operations the sender takes a digest of a message and signs the digest using the sender's private key. A digest is essentially a checksum, CRC or other preferably non-reversible operation such as a hash of the message, which is then signed. The signed digest is appended to the outgoing message, possibly along with the certificate of the sender and possibly any required certificates or CRLs. The receiver of this signed message must also take a digest of the message, compare this digest with the digest appended to the message, retrieve the sender's public key, and verify the signature on the appended digest. If the message content has been changed, the digests will be different or the signature on the digest will not verify properly. If the message is not encrypted, this signature does not prevent anyone from seeing the contents of the message, but does ensure that the message has not been tampered with and is from the actual person as indicated on the "from" field of the message.

The receiver may also verify the certificate and CRL if they were appended to the message. A certificate chain is a certificate along with a number of other certificates required to verify that the original certificate is authentic. While verifying the signature on a signed message, the receiver of the message will also typically obtain a certificate chain for the signing certificate and verify that each certificate in the chain was signed by the next certificate in the chain, until a certificate is found that was signed by a root certificate from a trusted source, such as, for example, a large Public Key Server (PKS) associated with a Certificate Authority (CA), such as, for example, Verisign or Entrust, both prominent companies in the field of public key cryptography. Once such a root certificate is found, a signature can be verified and trusted, since both the sender and receiver trust the source of the root certificate.

In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 4:
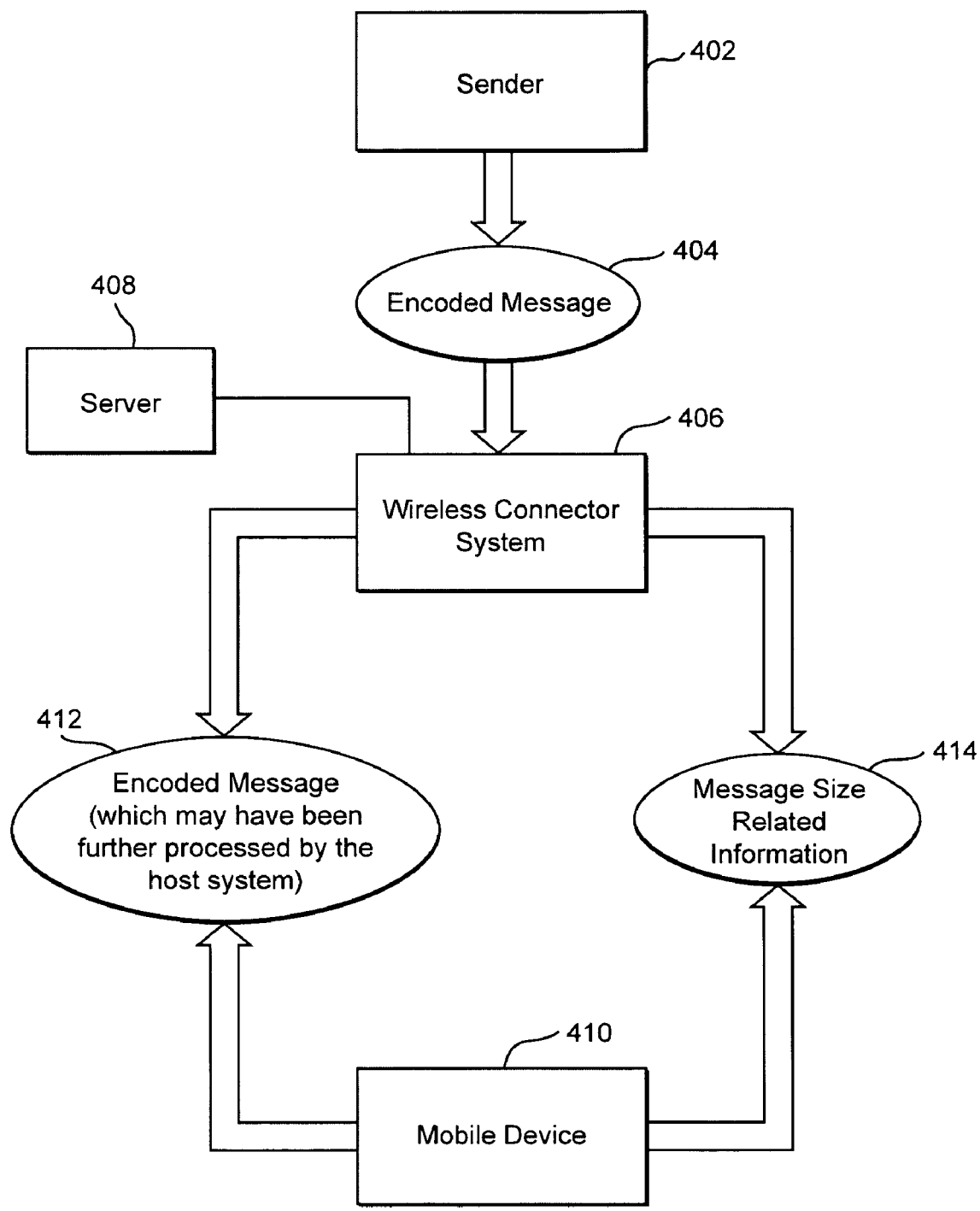
FIG. 4 is a block diagram depicting components used in handling encoded messages.

FIG. 4 illustrates a situation where encoded messages are provided to a mobile device 410 by a server 408 contained within a wireless connector system 406. With reference to FIG. 4, an encoded message 404 from a sender 402 is provided to the wireless connector system 406. The server 408 within the wireless connector system 406 analyzes the encoded message 404 with respect to its size. If the size is determined to be above some predetermined threshold, then the server 408 may notify the mobile device 410 with size related information 414. The server may process the encoded message 412 before sending it to the mobile device such that the encoded message 412 is below the predetermined threshold size. Moreover, data item 412 may be further processed by the server 408 such that the message is partially decoded and the result of such processing sent to the mobile device 410.

As an exemplary operational scenario, current mobile device implementations typically have a limit on the message size that will reach the mobile device, such as, for example, 32 KB. If an S/MIME message is over 32 KB, then the entire message will not completely reach the mobile device. As such, if the message is signed, then it cannot be verified on the mobile device due to the size limitation. The server in this situation may send an indication to the mobile device that the message is too large to be verified by the mobile device and that verification has already been done by the server. The user receiving this message will then be aware that verification of the message has already been accomplished. Different types of server-assisted verification of secure electronic messaging are described in co-pending, commonly assigned U.S. patent application Ser. No. 10/914,634 entitled "Server Verification of Secure Electronic Messages" and U.S. patent application Ser. No. 10/916,098, entitled "System and Method for Processing Encoded Messages," the disclosures of which are incorporated by reference herein in their entirety.

As an additional feature, according to an exemplary embodiment of the disclosure, the server, in addition to sending an indication that some level of verification of a secure message has been performed by the server, may also provide supplemental information to the mobile device to enable the mobile device to perform additional checks, such as, for example, checking the trust, validity, strength, etc. of the certificate used to sign the message.

Figure 5:
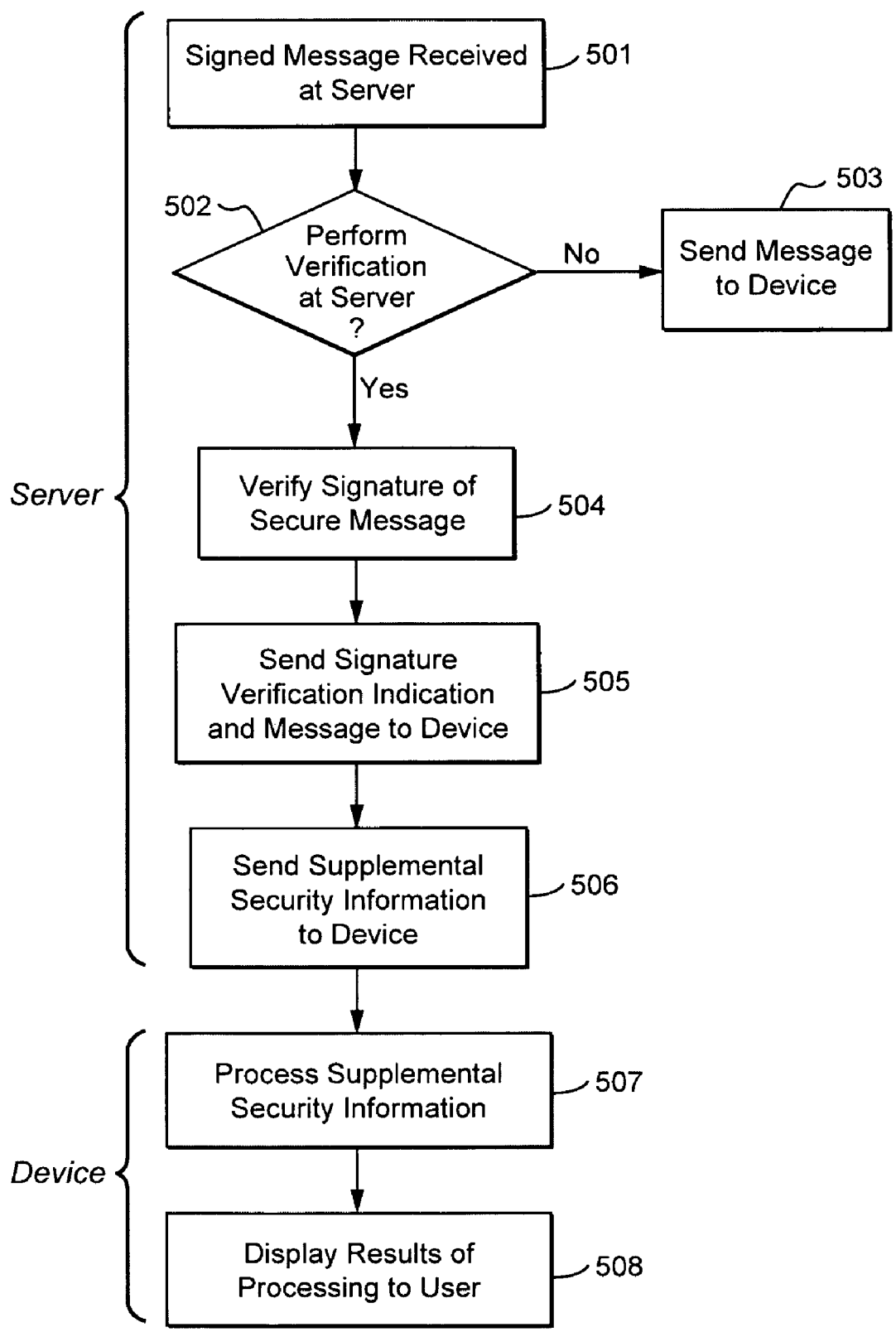
FIG. 5 is an illustrative flow diagram of an exemplary operational scenario for processing encoded messages according to an exemplary embodiment of the invention.

For example, with reference to FIG. 5, which is an illustrative flow diagram of an exemplary operational scenario for processing encoded messages according to an exemplary embodiment of the invention, the server receives a signed and/or encoded electronic message 501. Upon receiving the message, the server determines whether the server is to perform any verification of the secure message 502. This determination may be made based on any number of factors, such as, for example, when the size constraints of the device mandate some verification processing be performed by the server, as described in the co-pending commonly assigned applications listed above. On the other hand, the server may be configured to automatically provide verification for all secure electronic messages in order to reduce the computational overhead burden of the mobile device. If the server determines that no verification is to be performed by the server, the message is sent directly to the device 503.

However, if the server determines that it is to provide verification, the server processes the message to at least verify the signature of the secure message 504. Upon verification of the signature of the secure message, the server sends the message together with an indication to the device that the signature has been verified 505. In addition, according to an exemplary embodiment of the disclosure, supplemental information may also be sent to the device 506. This supplemental information may include, for example, a hash of the certificate or certificate chain used to verify the signature at the server.

By providing this supplemental information to the device 506, the device may then further process the supplemental information 507 to perform additional checks on the signature. For example, the device can process the hashed certificate information to determine and look up the certificate used to sign the message to perform additional checks, such as, for example, validity checks, trust checks, strength checks, or the like. The results of these additional checks may then be displayed 508 to the user.

Performing these additional checks provides the user with a stronger indication of the security of the message as compared to merely trusting the indication sent from the server that the signature has been verified. An additional advantage of the foregoing is the redistribution of the computing overhead between the server and the mobile device.

While the foregoing has been described in conjunction with specific exemplary embodiments, it is evident that many alternatives, modifications and variations will be apparent to those skilled in the art. Accordingly, the exemplary embodiments set forth herein are intended to be illustrative, not limiting. Various changes may be made without departing from the true spirit and full scope of the invention as defined in the appended claims.

What is claimed is:

1. A method for processing encoded messages comprising:
receiving an encoded message at a server;
processing said encoded message to verify a signature of the encoded message at said server and providing an indication of a result of said processing and the received message to a device for which the encoded message is intended;
providing supplemental information relating to verification of the signature from said server to said device; and
processing said supplemental information at said device to derive additional security information to certify authenticity of the message
wherein said supplemental information includes a hash of a certificate used to sign the encoded message.

2. The method according to claim 1, wherein said supplemental information includes a hash of a certificate chain including the certificate used to sign the encoded message.

3. The method according to claim 1, wherein said processing of said supplemental information comprises looking up the certificate used to sign the message and performing additional checks based on the certificate used to sign the message.

4. The method according to claim 2, wherein said processing of said supplemental information comprises looking up at least one of the certificate and certificate chain used to sign the message and performing additional checks based on the certificate used to sign the message.

5. The method according to claim 3, wherein said additional checks include validity checks, trust checks and/or strength checks.

6. The method according to claim 4, wherein said additional checks include validity checks, trust checks and/or strength checks.

7. A system for verifying encoded electronic messages, comprising:
a server for receiving an encoded message intended for a mobile device; and
program logic resident on said server for processing said encoded message at said server to verify a signature appended to said received message, providing an indication of a result of said processing of the received message and the received message to said mobile and providing supplemental information relating to verification of the signature from said server to said mobile device; and
wherein said wireless communications device includes program logic for processing said supplemental information to derive additional information to certify authenticity of the message, and to provide checks associated with said signature;
wherein said supplemental information includes a hash of a certificate used to sign the encoded message.

8. The method according to claim 7, wherein said supplemental information includes a hash of a certificate chain including the certificate used to sign the encoded message.

9. The method according to claim 7, wherein said processing of said supplemental information comprises looking up the certificate used to sign the message and performing additional checks based on the certificate used to sign the message.

10. The method according to claim 8, wherein said processing of said supplemental information comprises looking up the certificate and/or certificate chain used to sign the message and performing additional checks based on the certificate used to sign the message.

11. The method according to claim 9, wherein said additional checks include at least one of validity checks, trust checks, and strength checks.

12. The method according to claim 10, wherein said additional checks include at least one of validity checks trust checks, and strength checks.

13. A system for verifying encoded electronic messages comprising:
a server;
a mobile wireless communications device;
means for receiving an encoded electronic message at said server, the encoded message being intended for said mobile wireless communications device; and
means for processing said received message at said server to verify a signature appended to said received message, for providing an indication of a result of said processing of the received message to said mobile wireless communications device and for providing supplemental information relating to verification of the signature from said server to said wireless mobile communications device;
said mobile wireless communications device including program logic for processing said supplemental information to derive additional information to certify authenticity of the message, and to provide checks associated with said signature;
wherein said supplemental information includes a hash of a certificate used to sign the encoded message.

14. A method for processing encoded messages comprising:
sending supplemental information associated with an encoded electronic message from a server to a mobile device, the supplemental information including a hash of a certificate or certificate chain used to sign the encoded message; and
processing said supplemental information by said mobile device to determine the certificate used to sign the message and performing additional checks on said certificate to certify authenticity of the message.

15. A method for processing encoded messages comprising:
receiving an encoded message at a server;
processing said encoded message at said server to verify the encoded message and providing an indication of a result of said processing and the received message to a device for which the encoded message is intended;
providing supplemental information of said message from said server to said device, said supplemental information including a hash of a certificate used to sign the encoded message; and
processing, at said device, said supplemental information to look up the certificate used to sign the encoded message, to certify authenticity of the message, and to update trust status of said message based on information contained in the certificate.

* * * * *

UNITED STATES PATENT AND TRADEMARK OFFICE
CERTIFICATE OF CORRECTION

| | |
|---|---|
| PATENT NO. | : 7,509,120 B2 |
| APPLICATION NO. | : 10/934765 |
| DATED | : March 24, 2009 |
| INVENTOR(S) | : Michael K. Brown, Michael S. Brown and Herbert A. Little |

It is certified that error appears in the above-identified patent and that said Letters Patent is hereby corrected as shown below:

Column 9, line 33, after "include", insert --at least one of--;
Column 9, line 33, after "and", delete "/or";
Column 9, line 36, after "include", insert --at least one of--;
Column 9, line 36, after "and", delete "/or";
Column 9, line 46, after "mobile", insert --device--;
Column 9, line 50, delete "wireless communications" and insert --mobile-- before "device";
Column 9, line 57, delete "method" and insert --system-- therefor;
Column 9, line 60, delete "method" and insert --system-- therefor;

Column 10, line 1, delete "method" and insert --system-- therefor;
Column 10, line 3, after "looking up", insert --at least one of--;
Column 10, line 3, after "and", delete "/or";
Column 10, line 6, delete "method" and insert --system-- therefor;
Column 10, line 9, delete "method" and insert --system-- therefor; and
Column 10, line 26, delete "wireless mobile" and insert --mobile wireless-- therefor.

Signed and Sealed this

Twelfth Day of May, 2009

JOHN DOLL
*Acting Director of the United States Patent and Trademark Office*